May 20, 1952 F. W. MILLSPAUGH ET AL 2,597,743
SYNCHRONIZING SYSTEM
Filed Dec. 30, 1949
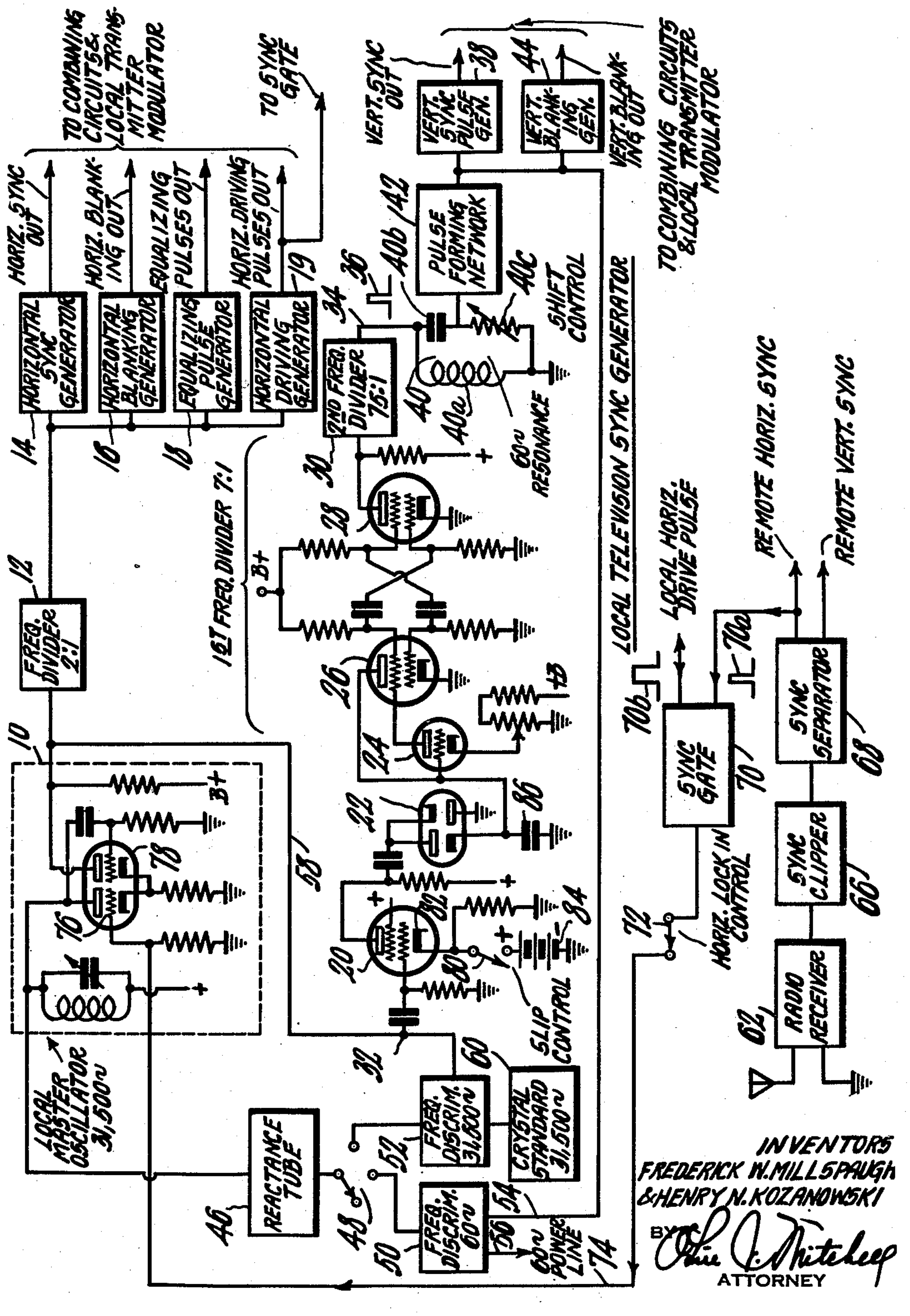
INVENTORS
FREDERICK W. MILLSPAUGH
& HENRY N. KOZANOWSKI
BY Olive J. Mitchell
ATTORNEY Patented May 20, 1952 2,597,743

UNITED STATES PATENT OFFICE 2,597,743

SYNCHRONIZING SYSTEM

Frederick W. Millspaugh, Haddonfield, and Henry N. Kozanowski, Audubon, N. J., assignors to Radio Corporation of America, a corporation of Delaware Application December 30, 1949, Serial No. 135,998

10 Claims. (Cl. 178—69.5)

The present invention relates to synchronizing systems for electrical signal generators and more particularly, although not necessarily exclusively to synchronizing lock-in methods and apparatus for remote and local television transmitting stations.

In more particularity, the present invention deals with an improved synchronizing lock-in arrangement for synchronously relating the operation of remote and local sync generators in modern day television transmitting apparatus.

In still another aspect, the present invention relates to a synchronizing lock-in arrangement for a television transmission system in which it is desirable to interchangeably transmit either a remotely generated television signal or a locally generated television signal in such a manner as to eliminate evidence of discontinuity in the signal transmission during the transition from the remote to the local signal source.

In television practice, television transmitting stations transmit a composite television signal which mainly comprises a video component, a synchronizing component and a blanking component. Generally, the synchronizing and blanking component are generated by a sync signal generating system preferably located at a position near the point of image pick up. A version of the synchronizing and blanking information is of course supplied to the image pick up equipment for synchronization of its scanning action in the production of the video signal. The synchronizing and blanking information is then mixed with the resulting image video signal to produce the composite signal for modulation of the television radio transmitter.

The sync signal generator for generating the synchronizing and blanking information is usually controlled by a master oscillator operating at a multiple of the image line frequency. In order to avoid drift in the operating frequency of the master oscillator and consequent irregularities in the reproduced television image, the master oscillator is commonly linked to some standard frequency source which, for example, may be the 60 cycle of the local public utilities power distribution system. A very convenient way of accomplishing this linkage is by means of comparing the field frequency rate of the field synchronizing pulse developed by the sync signal generator with the frequency of the local power line and correcting the frequency of the master oscillator in accordance with the degree of difference detected by this frequency comparison. Under proper operating conditions this ensures that the transmitted vertical synchronizing signals are always in synchronism with the 60 cycle supply main. Such apparatus is well-known in the art and one form widely used is described in detail in a paper by Smith and Bedford which appeared in the RCA Review for July 1940, vol. 5, No. 1 pages 51–68, "A precision television synchronizing signal generator."

Such a system is usually employed where only one sync signal transmitting chain is used or where program material originates only from scanning equipment operated by the local synchronizing signal generator. When, however, it is desired to transmit or retransmit program material originating from a remote location, it becomes desirable to supply some means for locking in the local sync generator with the remotely generated television signal. This lock-in feature is generally necessary because the remote pick-up equipment may be operated on an entirely different public utilities power supply system and hence be controlled in frequency and phase by a slightly different power line frequency from that of the main studios. If no lock-in feature is provided, switching from locally generated program material to remotely generated program material would result in a disturbance in the reproduced television image at television receiving locations due to discontinuity in synchronizing information applied to the television receiver beam deflection system.

Moreover, in the transmission of special effects such as "lap dissolve," video "wipes," or composite pictures by the superimposition of the remote and locally generated television signal, it is necessary to maintain precise synchronism and accurate phasing between the two signals undergoing the special effects process. For example, it is well known that failure to maintain proper lock-in between two superimposed television signals will create the effect of one picture drifting past the other. Correspondingly, improper synchronization in the case of the lap dissolve would produce a disagreeable displacement between the pictures being dissolved.

A variety of circuits have been proposed in the art for accomplishing the necessary lock-in between remote television signals and local sync generator operation. With the exception of wholly automatic type systems, it is generally necessary to visually compare by means of an oscillographic record or other suitable visual indicators, the actual timing relationship existing between the remotely generated synchronizing signal and the locally generated synchronizing signal. Once this relationship has been determined some means are then brought into action for interrupting the timing or operation of the local sync generator, as a whole, while the remote composite synchronizing signal and the local composite synchronizing signal exactly coincide. At the instant of coincidence the local sync generator is then firmly synchronized by the application of a remotely generated sync signal from the remote composite synchronizing signal.

In such prior art arrangements it can be seen that the operator in control of the lock-in procedure is required to be particularly alert in determining the exact instant of coincidence between remote and local sync. Particularly is this so in the case of present day interlaced television scansion. Here an additional phasing problem arises by merit of the fact that the composite television signal comprises alternate even and odd field representations. For example, in the standard 525 lined interlaced television system having a frame repetition rate of 30 frames per second each one of the two fields comprising a frame is displaced from its corresponding field by one-half a line interval. Consequently, in an interlaced television signal successive groups of line sync pulses embraced by the field blanking intervals are not symmetrical with respect to these field blanking intervals. Hence it is necessary for the operator to execute synchronized coincidence of both the remote and local horizontal sync pulses as well as the remote and local even and odd fields.

The present invention is involved with an improved arrangement for executing the required synchronization between the local television sync generator with incoming remote synchronizing signal information such as to minimize the degree of attention and skill required by the operator manually controlling the synchronization procedure.

It is therefore a major object of the present invention to provide a new and improved method and apparatus for synchronizing electronic signal generating circuits.

Another object of the present invention is to provide a new and useful method and apparatus for synchronizing present day television type sync generators.

Another object of the present invention is to provide a new and improved synchronizing method and apparatus which permits the selection for transmission of one or more individually timed and generated video signals without producing "drop outs" or tearing of reproduced images based on the transmitted signals.

Still another object of the present invention is to provide a method and apparatus for cosynchronizing a plurality of separately timed television signal sync generators in conjunction with special effects apparatus so as to improve the reproduced relationship between different image components of composite special effect scenes represented by the television signal.

In the synchronization of local sync generator operation by remote synchronizing signals, the present invention acts to first synchronize the local sync generator master oscillator operation with incoming horizontal sync signal with no regard to the relative overall phasing of the local and remote synchronizing signal composite wave forms. Means are then provided for interrupting the usual fixed timing and phase relationship between local master oscillator operation and the locally formed vertical sync so that local vertical sync is effectively made to slip or shift with respect to local horizontal sync. This shifting or slip is continued until the local vertical sync pulses coincide with remote vertical sync pulses. Under these conditions local even interlaced fields will be in exact respective coincidence with remote even interlaced fields and the desired lock-in between the stations is achieved. This lock-in of course remains in the discontinuance of the application of remote horizontal sync to the local master oscillator.

In the application of the present invention to conventional local sync generators, employing a master oscillator whose output is coupled to horizontal and vertical sync shaping networks through regular frequency divider networks, having appropriate numerical values of count-down or dividing action, slippage or shift between the local vertical sync and the horizontal sync pulses may be accomplished in a variety of ways. For instance in one exemplary form of the present invention a phase shifting network may be applied between the output of the vertical frequency divider and the input of the vertical sync shaping network. Whereas, in another exemplary mode of the invention, an electronic switch or variable conductance channel is interposed between the output of the master oscillator and the input of the vertical frequency divider. In the latter exemplary mode, the variable conductance channel may be made to intermittently and selectively interrupt the communication of the master oscillator output to the input of the variable frequency divider to effectively alter the numerical value of the count-down circuit and cause a net timing shift of the resulting vertical sync pulse relative to the local horizontal sync pulses.

A more complete understanding of the operation of the present invention as well as numerous other objects and features of advantage in addition to those set forth hereinabove will be gleaned from a perusal of the following description, especially when taken in connection with the accompanying drawing in which the present invention is show embodied in a conventional form of television sync generating circuits.

In the drawing there is illustrated in dotted line area 10 an exemplary form of a master oscillator circuit conventionally found in sync generator circuits. By way of example, the frequency of the oscillator has been indicated 31,500 cycles per second which is in accordance with present day television standards of a 525 lines picture scanned in two interlaced fields of 262½ lines each. In accordance with conventional sync generator arrangements, the master oscillator 10 is applied to a horizontal frequency divider 12 which operates to divide in half the master oscillator frequency of 31,500 C. P. S. so as to provide at the input of the horizontal sync generator 14 control pulses having the required repetition rate of 15,750 C. P. S. These 15,750 C. P. S. control pulses are also applied to the equalizing pulse generator 18 and horizontal driving generator 19. As is well known, the output of the generators 14, 16, 18, and 19 are, as indicated, directed to combining and processing circuits for subsequent modulation of the local television radio transmitter.

The output of the master oscillator 10 is further applied to the input of the first vertical frequency divider which is shown as being of the storage threshold-multivibrator type comprising discharge tubes 20, 22, 24, 26, and 28. This first frequency divider is by way of example, assigned a numerical divisor or count-down of 7 to 1 and is followed by a second vertical frequency divider indicated by block 30 which is adapted to execute 75 to 1 count-down. Thus from the input terminal 32 of the first frequency divider to the output terminal 34 of the second frequency divider there is executed the required 525 count-down which yields 60 cycle control pulses 36 at the output terminal 34. As in the case of the horizontal frequency divider output these control pulses are applied to the input of the vertical sync pulse generator 38 for control thereof. As will be described more fully hereinafter in relation to the present invention the coupling from the output of the second frequency divider 30 to the input of the vertical sync generator 38 is accomplished by a phase shifting network 40 whose output is connected with a pulse forming network 42. The vertical blanking generator 44 is, of course, also synchronized from the output of the pulse forming network 42. The outputs of the vertical sync generator and the blanking generator 38 and 44 are then, as indicated, applied to combining circuits for subsequent modulation of the local television radio transmitter in the same manner as the horizontal sync, horizontal blanking and equalizing pulses were handled.

There is further shown in the drawing, means for controlling the frequency of the local master oscillator 10. As illustrated, this may take the form of a conventional reactance tube circuit 46 whose control signal input at terminal 48 may be selectively switched for conventional operation to either a 60 cycle power line frequency discriminator at 50 or a crystal standard 31,500 C. P. S. frequency discriminator at 52. The comparative input to the 60 cycle frequency discriminator at 50, of course, may be taken from the output of the pulse forming network 42 via circuit path 54 and a connection 56 to the local power line voltage. Accordingly, comparative input to the crystal standard frequency discriminator 52 may be obtained directly from the output of the local master oscillator 10 via circuit path 58 and the output of a standard 31,500 C. P. S. crystal at 60. It is noted that the switch connected to the input 48 of the reactance tube 46 is adapted for an "idle" or no-input position which position is illustrated in the drawing. This permits the local master oscillator 10 to have full control of the sync generator operation with no stabilization either from the power line frequency or crystal standard.

It is in this latter position of the switch connected with terminal 48 of the reactance tube that lock-in of the local sync generator may be accomplished with respect to a remote television signal such as, for example, received by a radio receiver 62. It is to this latter general type of master oscillator control that the present invention is related.

The general arrangement and type of elements thus far shown and described in the drawing as forming the atmosphere of the present invention, are thought not to need further description due to their well known natures. Furthermore, in the interests of more clearly and distinctly pointing out the present invention which will be more fully described hereinafter, no connections have been shown for generating and channeling the video frequency components of the television signal since these components have no relation to the interests of the present invention. More complete sync generator considerations dealing in more detail with the functions and characteristics of the individual sync generator elements thus far treated, as well as the complex nature of the synchronizing wave forms produced by sync generators of this general type, may be had through reference to an article by J. P. Smith and Alda V. Bedford, "A Precision Synchronizing Generator" appearing in the RCA Review for July 1940, vol. 5, No. 1. This subject matter is further treated in detail in U. S. Patent 2,132,655 to J. P. Smith entitled "System for Producing Electrical Impulses," issued October 11, 1938. U. S. patent to A. V. Bedford, 2,223,812, issued December 3, 1940, entitled "Television System" further describes the general requirements of synchronizing wave forms as applied to interlaced type television systems.

In accordance with the present invention the local master oscillator 10 is, as indicated above, adapted for control by the remote horizontal sync as received and demodulated by the radio receiver 62. This is accomplished by separating the remote horizontal sync from the output of radio receiver 62 in a conventional manner through the use of a sync clipper 66 and a sync separator 68. The horizontal sync thus derived is applied to a sync gate circuit 70 whose output is, via horizontal lock-in control switch 72 and circuit path 74, applied to the local master oscillator 10 for synchronism thereof. By way of example, the output of the horizontal gate circuit is indicated as being directly applied to the grid 76 of the master oscillator discharge 78.

The function of the sync gate circuit is quite conventional in nature, it or its equivalent being required to differentiate between remote horizontal sync and remote equalizing pulses thereby to avoid missynchronization of the local master oscillator. In the arrangement shown the block 70 is merely a threshold device which employs the output of the local horizontal drive generator as a keying pulse. Thus the sync gate circuit will pass remote horizontal sync 70*a* only when this remote sync coincides with a local horizontal driving pulse 70*b*. In this way the output local frequency divider 12 will be rendered in isochronism with the remote horizontal or line sync pulses and part of the requirements for remote and local lock-in will have been realized.

It is well to note that the sync gate circuit 70 along with the circuit path 74 applying its output to the master oscillator 10 may be replaced by a variety of circuits for line synchronizing the local master oscillator with remote sync. For example, any well known bridge type frequency comparator circuit could be used, with its output adapted to control the reactance tube 46.

In further accordance with the present invention, means are then provided for interrupting or temporarily altering the otherwise fixed frequency relationship between the local vertical sync generated by the local sync generator 38 and the output of local master oscillator 10. Although this may be accomplished in a variety of ways, two particularly conventional arrangements for this purpose are shown in the drawing. One control mode may be termed a "slip" control while the other form of control may be thought of as a "shift" control, the shift control generally being used as a vernier adjustment for more precision lock-in alignment of the local vertical sync with the remote vertical sync.

Assuming now, for convenience in understanding the operation of the present invention, that the local horizontal and remote horizontal sync pulses have been established in synchronism with one another through local master oscillator control hereinbefore described, and that at the time the remote horizontal sync took over control of local master oscillator, the remote vertical sync was not in coincidence with the local vertical sync. It is then only necessary to withhold application of master oscillator signal from the first storage threshold multivibrator frequency divider for one or more measured intervals of time. This may be easily accomplished by biasing the cathode of the first frequency divider amplifier 20 highly positive. Thus the slip control may merely take the form of a switch 80 adapted to connect the cathode 82 of tube 20 to the positive terminal of a positive voltage source 84. This will reduce the amount of energy applied to the first frequency divider storage capacitor 86 which means that it will take a larger number of master oscillator signals to reach the firing threshold of the first frequency divider multivibrator control circuit 24, 26, 28. Reference to page 27 of the above cited vol. 5 of the RCA Review will then show that this reduction of energy applied to capacitor 86 will increase the dividing factor of the first frequency divider to some numerical value below 7 and hence destroy the fixed frequency relationship between the local horizontal sync and the local vertical sync. This will then, in effect, allow the local vertical sync to slip relative to the local horizontal sync, that is, slip with respect to timing or phase. This, of course, will also mean that the local vertical sync will shift with respect to the remote vertical sync. This shifting is then continued until coincidence between the local and remote vertical sync is obtained at which time the slip control switch 80 is allowed to remain in the open position to reestablish the nominal count-down of the first frequency divider to a numerical divisor of 7 to 1.

Numerous ways may be utilized to determine when coincidence by local vertical and remote vertical sync occurs, such as oscillographic records or visual inspection of superimposed local and remote television rasters. These techniques are well known in the art, one of which by way of example, is discussed in an article by R. A. Montfort and F. J. Somers entitled "Measurement of sync and duration of television synchronize impulses" appearing in the RCA Review, vol. 6, No. 3, pages 370–389 for January 1942. An even more detailed discussion of visual determination of remote and local synchronizing signal coincidences is found in an article by James R. De Baun entitled "Interlock scanning for network television" appearing in the December 1947 issue of the RCA Review.

An additional way of shifting the local vertical sync relative to the local horizontal sync, once partial horizontal lock-in of the remote horizontal generators has been established, is exemplarily indicated by elements 40. Here, in accordance with present invention, the output of the second frequency divider 30 is applied to a phase shifting network 40 which may take a variety of forms. As indicated the pulse 36 appearing at the output of the second frequency divider 30 is applied to a 60 cycle horizontal circuit comprising inductance 40*a*, capacitance 40*b* and resistance 40*c*. By varying the value of resistance 40*c* it is possible to cause a perceptible change in the relative phase of the sinusoidal wave applied to the pulse forming network 42 and hence the relative phase of the developed vertical sync pulse. The shift control 40*c* may be thought of as a vernier type control in the application shown herein, however, if it is desired the phase shifting network 40 may be replaced by other forms of phase shifting networks having a larger phase shifting range. For example, a very satisfactory type of phase shifting network for this application may be based upon the pulse-sine wave converter described in the March 1949 issue of Electronics in an article by W. M. Cameron entitled "Pulse sine wave converter." It is clear that if sufficient phase shift range is provided, the slip control 80 may be omitted whereas if the sensitiveness of the slip control 80 is made sufficiently great, the shift control 40 may be eliminated.

From the foregoing, it will be seen that the applicant has provided a simple and inexpensive method and apparatus for establishing precision lock-in between the remote and local television transmitting station. The degree of operator skill required to effect lock-in between the stations is relatively low and the rapidity with which locked-in condition can be achieved is extremely high.

Having thus described our invention what we claim is:

1. In a television synchronizing system, a first and a second composite wave generator, each generator including a base oscillator from which is synchronously derived a high and low frequency component for each composite wave, said second composite wave low frequency component being related to its respective base oscillator by a frequency divider mechanism, having a predetermined value of divisor, means for deriving a timing signal from said second composite wave high frequency component, means for synchronizing said first base oscillator with said timing signal, means for intermittently and momentarily altering the divisor of said frequency divider mechanism, and means for manually actuating said divisor altering means such to effect momentary timing slippage of said second wave low frequency component relative to its base oscillator during the period of said synchronous control of its respective base oscillator whereby low frequency components of said first and second composite waves may be superimposed in time.

2. In a television synchronizing system having a signal generator adapted to formulate the sync signal component of a composite television signal, said sync component comprising a horizontal sync portion and a vertical sync portion, the combination of, a master oscillator adapted to develop a master signal frequency which is substantially fixed in value relative to the horizontal and vertical sync component frequencies, means for conditionally synchronizing said master oscillator from a source of control signal, a first frequency divider circuit having its input supplied with the output of said master oscillator, the dividing factor of said first divider circuit being such to provide at the output thereof the desired horizontal sync signal frequency, a second frequency divider circuit having its input supplied with the output of said master oscillator, the dividing factor of said second divider circuit being such to provide at the output thereof the desired vertical sync signal frequency, means for shaping the outputs of both said first and second divider circuits to respectively provide horizontal and vertical sync pulses, and means connected with said second divider circuit for interrupting the signal timing normally produced at the output of said second divider circuit relative to said master oscillator output whereby the timing of developed vertical sync pulses may be controlled relative to timing defined by said master oscillator control signal source.

3. In a television synchronizing system having a signal generator adapted to formulate the sync signal component of a composite television signal, said sync component comprising a horizontal sync portion and a vertical sync portion, the combination of, a master oscillator adapted to develop a master signal frequency which is substantially fixed in value relative to the horizontal and vertical sync component frequencies, means for conditionally synchronizing said master oscillator from a source of control signal, a first frequency divider circuit having its input supplied with the output of said master oscillator, the dividing factor of said first divider circuit being such to provide at the output thereof the desired horizontal sync signal frequency, a second frequency divider circuit having its input supplied with the output of said master oscillator, the dividing factor of said second divider circuit being such to provide at the output thereof the desired vertical sync signal frequency, means for shaping the outputs of both said first and second divider circuits to respectively provide horizontal and vertical sync pulses, and means for selectively disabling said second frequency divider circuit for definable intervals during synchronous control of said master oscillator by said source of control signals whereby the phase of developed vertical pulses may be controlled relative to timing defined by said master oscillator control signal source.

4. Apparatus according to claim 3 wherein said second frequency divider circuit is of the storage threshold-multivibrator variety comprising in part a threshold actuated multivibrator, a storage circuit applied across the input to said multivibrator, a rectifying circuit having its output connected in storage relationship with said storage circuit with means for applying the output of said master oscillator to the input of said rectifying circuit, and wherein said selective disabling means comprises means for interrupting the application of master oscillator output signal to the input of said rectifying means.

5. In a television synchronizing system having a signal generator adapted to formulate the sync signal component of a composite television signal, said sync component comprising a horizontal sync portion and a vertical sync portion, the combination of, a master oscillator adapted to develop a master signal frequency which is substantially fixed in value relative to the horizontal and vertical sync component frequencies, means for conditionally synchronizing said master oscillator from a source of control signal, a first frequency divider circuit having its input supplied with the output of said master oscillator, the dividing factor of said first divider circuit being such to provide at the output thereof the desired horizontal sync signal frequency, a second frequency divider circuit having its input supplied with the output of said master oscillator, the dividing factor of said second divider circuit being such to provide at the output thereof the desired vertical sync signal frequency, means for shaping the outputs of both said first and second divider circuits to respectively provide horizontal and vertical sync pulses, and a controllable phase shifting network serially connected between the output of said second frequency divider and the input of said vertical sync pulse shaping means whereby the timing of developed vertical sync pulses may be controlled relative to timing defined by said master oscillator control signal source when said control signal source is placed in the synchronous control of said master oscillator.

6. In a synchronizing system for effecting "lock-in" between a local and remote television sync generator both of substantially the same timing characteristic such as to each produce an odd and even frame composite sync signal including horizontal and vertical sync pulses and representing an interlaced scanning raster, the local sync generator having a master oscillator productive of a base signal discretely related in frequency to both the desired local horizontal and vertical sync pulses, the combination of, means for receiving remote composite signal and separating therefrom horizontal and vertical sync pulses, means for conditionally and synchronously controlling said local master oscillator with separated remote horizontal sync pulses, a frequency dividing circuit in said local sync generator, the input of said dividing network being supplied with signals derived from the output of said master oscillator while the output of said dividing network is coupled to a local vertical sync pulse shaping network, and means connected with said frequency dividing circuit for interrupting the signal timing normally produced at the output of said divider circuit relative to said master oscillator output whereby the timing of developed vertical sync pulses may be controlled relative to the timing of said remote horizontal and vertical sync such that local even frames may be rendered coincident in timing with remote even frames.

7. In a synchronizing system for effecting "lock-in" between a local and remote television sync generator both of substantially the same timing characteristic such as to each produce an odd and even frame composite sync signal including horizontal and vertical pulses and representing an interlaced scanning raster, the local sync generator having a master oscillator productive of a base signal discretely related in frequency to both the desired local horizontal and vertical sync pulses, the combination of, means for receiving remote composite signal and separating therefrom horizontal and vertical sync pulses, means for conditionally and synchronously controlling said local master oscillator with separated remote horizontal sync pulses, a frequency dividing cicuit in said local sync generator, the input of said dividing network being supplied with signals derived from the output of said master oscillator while the output of said dividing, network is coupled to a local vertical sync pulse shaping network, and means for selectively disabling said frequency divider circuit for controllable intervals during synchronous control of said master oscillator by said separated remote sync pulses whereby the local vertical sync pulses may be shifted in phase relative to remote vertical sync pulses to permit adjustable coincidence between local even frames with remote even frames.

8. Apparatus according to claim 7 wherein said frequency divider circuit is of the storage threshold-multivibrator variety comprising in part a threshold actuated multivibrator, a storage circuit applied across the input to said multivibrator, a rectifying circuit having its ouput connected in storage relationship with said storage circuit with means for applying the ouput of said master oscillator to the input of said rectifying circuit and wherein said selective disabling means comprises means for interrupting the application of master oscillator output signal to the input of said rectifying means.

9. In a synchronizing system for effecting "lock-in" between a local and remote television sync generator both of substantially the same timing characteristic such as to each produce an odd and even frame composite sync signal including horizontal and vertical sync pulses and an interlaced scanning raster, the local sync generator having a master oscillator productive of a base signal discretely related in frequency to both the desired local horizontal and vertical sync pulses, the combination of, means for receiving remote composite signal and separating therefrom horizontal and vertical sync pulses, means for conditionally and synchronously controlling said local master oscillator with separated remote horizontal sync pulses, a local vertical sync pulse shaping network adapted to transform signal energy at vertical sync pulse rate to wave energy having a desired vertical sync pulse contour, a frequency dividing circuit having a nominal dividing factor equal to the ratio between the local master oscillator frequency and the desired vertical sync pulse rate, connections applying the output of said dividing circuit to the input of said pulse shaping network, an electronic switch connected between the output of said master oscillator and the input of said frequency divider for conditionally interrupting application of the input signal to said frequency divider, and means for manually actuating said switch such as to effect slipping of the timing of said local vertical sync pulses relative to said remote vertical sync pulses.

10. In a synchronizing system for effecting "lock-in" between a local and remote television sync generator both of substantially the same timing characteristic such as to each produce an odd and even frame composite sync signal including horizontal and vertical pulses and representing an interlaced scanning raster, the local sync generator having a master oscillator productive of a base signal discretely related in frequency to both the desired local horizontal and vertical sync pulses, the combination of, means for receiving remote composite signal and separating therefrom horizontal and vertical sync pulses, means for conditionally and synchronously controlling said local master oscillator with separated remote horizontal sync pulses, a frequency dividing circuit in said local sync generator, the input of said dividing network being supplied with signals derived from the output of said master oscillator while the output of said dividing network is coupled to a local vertical sync pulse shaping network, and a controllable phase shifting network serially connected between the output of said frequency divider and the input of said vertical sync pulse shaping means whereby the timing of developed vertical sync pulses may be controlled relative to the timing established by said demodulated horizontal and vertical sync pulses.

FREDERICK W. MILLSPAUGH.
HENRY N. KOZANOWSKI.

REFERENCES CITED

The following references are of record in the file of this patent:

UNITED STATES PATENTS

| Number | Name | Date |
|---|---|---|
| 2,132,655 | Smith | Oct. 11, 1938 |
| 2,223,821 | Bedford | Dec. 3, 1940 |
| 2,258,943 | Bedford | Oct. 14, 1941 |
| 2,278,788 | Knick | Apr. 7, 1942 |
| 2,329,339 | DeBaun | Sept. 14, 1943 |
| 2,350,536 | Schlesinger | June 6, 1944 |